Sept. 1, 1936. A. G. O'KONESKY 2,052,893
ANTISKID DEVICE
Filed Feb. 23, 1933
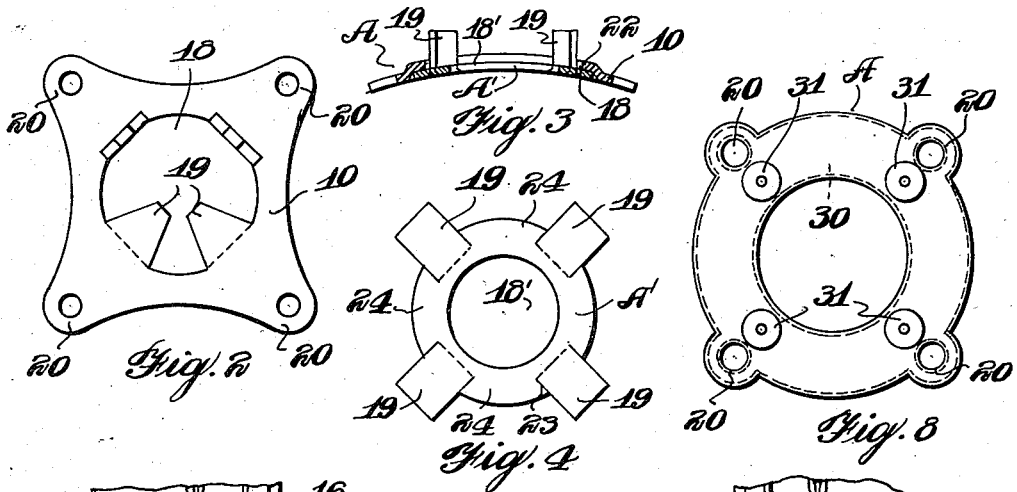
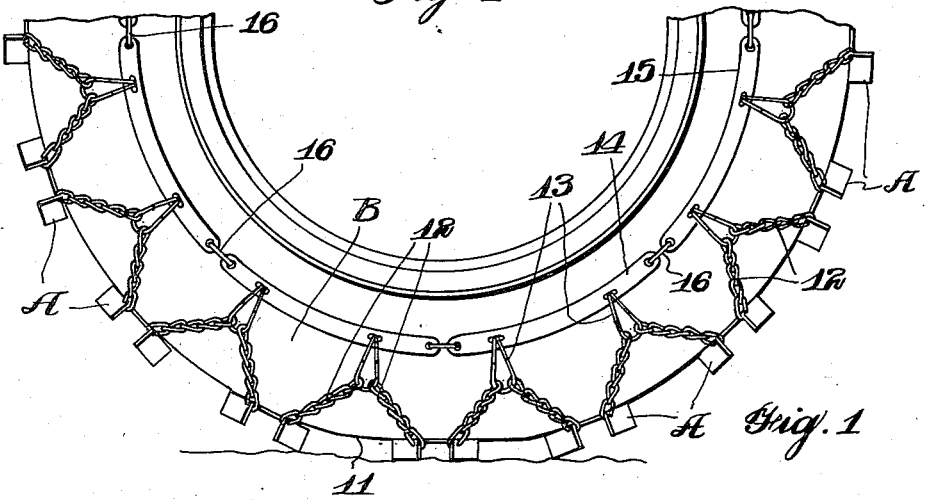
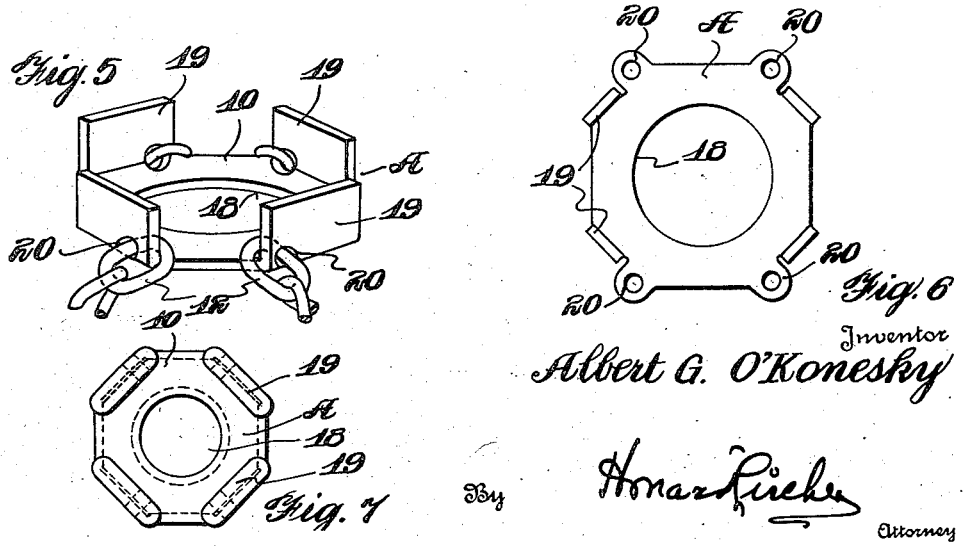
Inventor
Albert G. O'Konesky
By Honar Riehe
Attorney Patented Sept. 1, 1936

2,052,893

UNITED STATES PATENT OFFICE 2,052,893

ANTISKID DEVICE

Albert G. O'Konesky, St. Paul, Minn.

Application February 23, 1933, Serial No. 658,072

6 Claims. (Cl. 152—14)

My invention relates to an anti-skid device for automobile and vehicle tires, having a simple character and designed to accomplish the result of preventing the wheels of the vehicle from skidding in any direction.

A feature of my anti-skid device includes a plate-like member which is adapted to be engaged at four points by chain members which connect the plate in a manner to hold it from all four directions against movement, keeping the same on the tread of the vehicle wheel. The holding of my anti-skid plate in this manner provides a means for preventing the same from twisting under strain or operation, and thus holds the anti-skid plate in a more effective manner.

Further, my anti-skid device includes a road engaging plate having a character wherein calks may be provided which are angularly disposed in relation to each other so as to form road gripping calk members extending from the plate which will prevent skidding on icy roads as well as holding the wheels of the motor vehicle against skidding in soft or muddy ground. My anti-skid plate is simple in character, nevertheless it is provided with certain features or characteristics which are of primary importance in the successful use and operation of the same. One of these features resides in the open center portion of the plate which permits the tread of the tire on which the plate lies, to act to force the mud or surface dirt out of the plate by a suction or pumping action which keeps the plate clean and free of clots of mud or dirt so that it is always in readiness to grip the ground with the best results.

My anti-skid device includes a plate member which is adapted to be held from the several directions by the cross chains which extend to the ring-like member on either side of the tire and which includes a structure wherein the calk may be separated or made replaceable from the supporting plate so that when any of the calk members are worn out they can be readily replaced by driving a new plate with calks thereon into the holding plate. When the plate acts as a support for the calk member, then it may be formed without calks on itself and may be slightly larger than where the calks are formed directly on the plate which engages the tread.

It is also a feature to provide an anti-skid device wherein the plates and calk members may be held from the several directions and spaced apart around the tread of the tire so that they form a continuous treading surface for the wheel on which they are attached. Thus the wheel will not be bumped like it would be where the ordinary cross chains are employed or other calk members, but is caused to ride around on the calks of my anti-skid device continuously, changing from one calk portion to the adjacent calk portion.

Another feature is to provide a calk plate which is covered with rubber or other resilient material so as to provide a more quiet and flexible means of engaging the ground and to position the same on the tread of the tire over which it is used. Any of the plate members or calk plate members may be so covered with rubber either by the present processes or electro-plating the rubber onto the same, or by such a molding process as may be most desirable.

There are other features and objects of this invention of primary importance, all of which will be clearly and definitely defined herein.

The drawing illustrates my anti-skid device in use and:

Figure 1 is a side view of a portion of an automobile tire, showing the relation of my anti-skid device when it is connected thereto, and with the calks held in place by the plate members extending over the tread of the tire.

Figure 2 illustrates a form of calk plate where the calks are died out from a flat plate member, showing some of the calks in the flat formation and others bent up into the final formation in the center opening of the plate.

Figure 3 is a section through another form of my calk plate, where the larger plate portion acts as a supporting means for the inner calk plate which is replaceable when the calks wear down.

Figure 4 is a diagrammatic view, showing the died out formation of the replaceable calk plate used in Figure 3.

Figure 5 is a perspective of a form of my calk plate for my anti-skidding device.

Figure 6 illustrates another form of the calk plate.

Figure 7 illustrates one of the calk plates of the construction of Figure 5, formed with a rubber or other resilient covering.

Figure 8 illustrates a form of my anti-skid plate where removable calks may be screwed into the plate and the plate may be covered with a composition or made up of metal reinforcing parts embedded in a non-metallic composition covering.

My anti-skid device includes one or more calk plates which are designed to engage the ground with calks formed projecting angularly in relation to each other so as to form an anti-skid means to prevent skidding of the vehicle wheel in any direction. The calk plates A are adapted to be held spaced apart when used collectively or in series on the tire B, with the flat washer-like or disc body portion 10 bearing against the tread 11 of the tire B and held in operative position by several cross chains 12. The cross chains 12 may connect through a link 13 with the ring-like floating anchor member 14. The member 14 is made up of a series of arcuated segments 15 loosely connected together by the chain links 16. The members 15 are narrow flat plate-like portions and formed arcuated to make the complete ring 14 on either side of the tire B, and form the floating anchor for the ends of the cross chain which does not expand or contract beyond the flexible connection 16.

Each calk plate A may be formed of sheet metal and provided with a central clearing opening 18, while the calk portions 19 project from the plate-like body portion 10 and are angularly disposed in relation to each other to brace the calk plate A in all directions. The calk plate A may be of a material which can be case hardened so as to provide long wearing calk portions 19, if it is desired. The calk plates A may also be easily removed and replaced by disconnecting the same from the cross chains 12 or the links 13.

Each calk plate A is adapted to be supported from the several points, such as 20, which may be openings through which one end of the chains 12 connect freely so as to prevent excess wear on the chain or may be in the form of a flat eye like that illustrated in Figures 2 or 6. This provides a means of supporting each calk plate held from several spaced apart positions about the plate, thereby preventing undue twisting or shifting of the plates A in use.

It is desirable that the plates A be used where the calks 19 are comparatively long in spaced apart relation to each other, being close enough together, however, to form a continuous riding surface on the outer edges of the calks so as to prevent bumping or bearing on the tread of the tire to any appreciable extent. The calk plates may be used in any suitable manner as may be desired to form the anti-skid device defined.

It is desirable to form the calk plates A, as illustrated in Figure 2, where the calks 19 are formed by cutting out the central portion of the body plate 10 of the same to form the central clearing opening 18. When the calk plate A is formed in this manner the calks 19 are angularly disposed from radial portions cut out of the portion which forms the opening 18 and are bent up into operative position.

My calk plate A may also be formed as illustrated in Figures 3 and 4, where the main body 10 of the calk plate is provided with a counter-sunk recess 22 formed marginally of the opening 18 and adapted to receive the removable central calk plate A' which carries the calks 19 and which is formed with a central clearing opening 18'. Figure 4 illustrates diagrammatically the died out formation of the calk plate A' showing the manner in which the calks are cut into the body of this plate at 23 and showing the relative position and formation of the flange 24. When the calks 19 are cut out of the plate A', they are bent up into the position illustrated in Figure 3 and the flange 24 is formed between the calks. Whenever it is desirable to replace the calk plate A' after the calks are worn down so as to impair their usefulness, the plate A' is simply driven out of the opening 18 and a new calk plate A' is driven into place. The calk plate A and A' may be made slightly arcuated to fit over the tread of the tire if it is desired.

The calk plate A may be in the form illustrated in Figure 7, where the calks 19 as well as the body 10 of the plate may be covered with rubber which has been molded onto the same or any other suitable flexible material may be employed to cover the calks and the plate to form a calked road engaging means which may operate more quietly when used on the tire B.

My anti-skid device operates to hold a tire against skidding in any direction and accomplishes desirable results in safely guiding a vehicle over ice, snow or through the mud or soft ground, and an important feature of the structure resides in the clearing opening 18 which co-opertes with the tread 11 of the tire to permit the tread of the tire to pump or force the dirt or road material out of the center of the calk plate A in the operation of the anti-skid device so that in this manner I provide an anti-skid device which is self-clearing of dirt or material between the calks, thereby permitting them to be free to grip the ground at all times.

Figure 8 illustrates the anti-skid member A made up in a form similar to the other structures, excepting that the body, such as 10, of the anti-skid device is made up of composition, like rubber and fabric, molded and vulcanized together to form the body of the plate with the openings 20 for the cross chains. Within the body portion 10 of the structure illustrated in Figure 8, suitable metal reinforcing means 30 is anchored to reinforce the non-metallic body portion and to provide an anchor into which the calks 31 may be screwed. As many calks 31 as may be desired, may be used and the reinforcing means 30 may be of any suitable shape or design. It is also apparent that any of the metal body plates 10 of the structures set forth may be formed with threaded openings to receive calks, such as 31, which screw into the same in place of the integral calks 19. It is also apparent that the structure of the body 10 illustrated in Figure 3, may be made of fabric with a reinforcing means around the counter-sunk portion 22 and that the metal replaceable calk plate A' may be held therein in operative position.

I do not wish to limit the invention to the use of any particular material, but desire to have it understood that the parts may be made of metal or rubber and fabric, or other combinations of materials which would be common and well known as being desirable for the purpose. For instance, trucks might use the metal plates entirely, whereas, the pleasure cars would be inclined to use the fabric or rubber plates in the form of the construction set forth.

I claim:

1. An anti-skid device for automobile tires including, a body plate adapted to extend over the tread of the tire, means for engaging said body plate from spaced apart points to hold the same against twisting on the tread, a calk plate carried by the body plate, road engaging calks formed by bending a portion of the body of the calk plate projecting angularly in relation to each other from said calk plate and angularly to the direction of travel of the tire, and an opening through the center of said calk plate which permits the tread of the tire to force any material lodging between the calks free of the plate to keep the same clean in operation.

2. An anti-skid device including, a body plate having a detachable road engaging plate adapted to be supported upon the tread of a tire, calks extending from said road engaging plate formed by bending a portion of said plate angularly disposed with respect to the direction of movement of the tire, means for holding said body against twisting on the tread of the tire, and an opening formed through said road engaging plate to permit the tread of the tire to clear the plate of any road particles.

3. An anti-skid plate for tires including, a flat sheet-like body portion, ears projecting from four points spaced around said body portion adapted to be connected to cross chains to hold said body against twisting, a calk plate secured to said body portion, a central dirt clearing opening formed in said plate, and a series of angularly disposed calks projecting therefrom extending diagonally across the tread of the tire and adapted to engage the ground to hold the tire on which said anti-skid plates are used from skidding in any direction.

4. An anti-skid plate device for the tread of a tire including, a plate-like body portion formed to fit flat against the tread of the tire, an opening formed centrally in said plate having a counter-sunk marginal edge, a plate formed of sheet material having calks bent from said plate to project therefrom, and a peripheral flange adapted to fit in said counter-sunk portion of said first plate, whereby said calk plate may be replaced when desired.

5. An anti-skid device including, a flat plate adapted to engage the surface of a tire, a raised portion offset from said flat plate, an opening through said offset portion, a calk portion adapted to extend through said opening, said calk portion including a series of calks bent from the body of said calk portion at a point spaced inwardly from the outer edge of said calk portion.

6. An anti-skid device including, a flat tire engaging plate, an opening therethrough, an offset portion in said plate about said opening, a calk portion extending through said opening including a flat body, calks bent from said body from the outer edge thereof, the point of bend being spaced inwardly from the outer edge, said outer edge adapted to be positioned in said offset portion.

ALBERT G. O'KONESKY.